United States Patent [19]

Pritchett

[11] 4,141,936

[45] Feb. 27, 1979

[54] HIGH IMPACT STRENGTH POLYMER TRIBLENDS

[75] Inventor: Ervin G. Pritchett, Cincinnati, Ohio

[73] Assignee: National Distillers and Chemical Corporation, New York, N.Y.

[21] Appl. No.: 842,133

[22] Filed: Oct. 14, 1977

[51] Int. Cl.$^2$ .................... C08L 23/08; C08L 35/06
[52] U.S. Cl. ............................ 260/897 C; 260/898; 260/DIG. 32
[58] Field of Search ............ 260/897 C, DIG. 32

[56] References Cited

U.S. PATENT DOCUMENTS

| | | | |
|---|---|---|---|
| 3,085,082 | 4/1963 | Baer et al. | 260/897 |
| 3,283,035 | 11/1966 | Schnebelen | 260/897 |
| 3,644,577 | 2/1972 | Lee | 260/876 R |
| 3,658,950 | 4/1972 | Eusebi | 260/897 |
| 3,758,661 | 9/1973 | Yamamoto | 260/897 C |

*Primary Examiner*—Carman J. Seccuro
*Attorney, Agent, or Firm*—Kenneth D. Tremain

[57] ABSTRACT

The impact strength of styrene-acrylonitrile copolymer is significantly improved without loss of injection moldability by the addition thereto of ethylene-vinyl acetate copolymer or ethylene-vinyl acetate-vinyl alcohol terpolymer together with a chlorinated polymer such as polyvinyl chloride or chlorinated polyethylene.

22 Claims, No Drawings

HIGH IMPACT STRENGTH POLYMER TRIBLENDS

BACKGROUND OF THE INVENTION

1. Field of the Invention

This invention relates to the field of polymer blends or alloys containing ethylene vinyl acetate (EVA) copolymer or ethylene vinyl acetate vinyl alcohol (E-VA-VOH) terpolymer, as polymeric impact modifiers for brittle styrene-acrylonitrile copolymer.

2. Description of the Prior Art

It is well known that relatively few polymer-polymer blends have useful properties due to their incompatibility. Even useful polymer blends, such as those of nitrile rubber in styrene-acrylonitrile (SAN) copolymer to increase impact strength, have been greatly improved by substituting rubber-SAN graft copolymers for the nitrile rubber to provide superior impact resistance. These well known compositions are now generally referred to as the ABS (acrylonitrile-butadiene-styrene) resins.

Techniques other than that of graft polymerization have been employed for introducing compatibility in polymer blends, or alloys. Thus, for example, as described in U.S. Pat. No. 3,906,057, a block copolymer which combines blocks of two homopolymers in a single macromolecule will compatibilize a blend of the homopoloymers when added in amounts of about 5 – 40 weight parts per hundred parts of blend. Similarly, U.S. Pat. No. 3,485,777 describes the compatibilization of polymer blends by the addition of a graft copolymer having molecular segments of solubility characteristics similar to the solubility characteristics of the blended component polymers. Variations of these compatibilization techniques include coupling polymer components in situ with coupling agents as described in U.S. Pat. No. 3,645,939, or by functional group coreaction as disclosed in commonly assigned copending U.S. patent application Ser. No. 600,332, filed July 30, 1975.

These methods of obtaining compatibilization in polymer blends are of limited usefulness since they each depend upon some special additive and extensive working or a chemical reaction to achieve the result desired. Accordingly, attempts have been made in the past to obtain compatibilized polymer blends by merely blending the component polymers using simple known and conventional procedures. A number of polymer alloys containing EVA copolymer or E-VA-VOH terpolymer and one or more other polymers are known. U.S. Pat. No. 3,283,025 describes a polymer blend of polyvinyl chloride (PVC) containing at least 80 weight percent vinyl chloride and optionally having incorporated therein minor quantities of a copolymerizable monomer such as acrylonitrile, together with 2 to 40 parts by weight of said PVC of an EVA copolymer containing 2 to 65 weight percent vinyl acetate and 3 to 10 parts by weight of said PVC of a chlorinated polyethylene (CPE) containing 35 weight percent chlorine. No mention is made of the use of a SAN copolymer in the aforesaid polymer blends. U.S. Pat. No. 3,322,858 describes multicomponent polymer blends containing vinyl chloride grafted EVA copolymers of up to 50 weight percent EVA copolymer (with the working examples indicating a preference for substantially smaller quantities of EVA copolymer in the graft resin), a CPE resin and a SAN copolymer as a processing aid. U.S. Pat. No. 3,549,727 discloses polymer blends containing E-VA-VOH terpolymer. The use of PVC, CPE and/or SAN copolymer are neither disclosed nor suggested. U.S. Pat. No. 3,644,577 describes polymer blends containing 60 to 95 weight percent PVC and 40 to 5 weight percent of a nitrile copolymer such as SAN copolymer. The blends may also contain as an optional ingredient an impact modifier such as an EVA copolymer. The characteristics of the polymers disclosed in this patent are largely those of PVC reflecting the dominant presence of this resin in the blends. U.S. Pat. No. 3,758,661 is illustrative of a two component blend containing a copolymer of an alpha-olefin and a copolymerizable monomer therewith, e.g., EVA copolymer, and a resin having poor compatibility with the olefinic resin such as SAN copolymer or PVC. U.S. Pat. No. 3,960,986 describes impact-resistant molding compositions containing 20 to 80 percent PVC, 19.5 to 75 weight percent of a vinyl chloride graft copolymer of ethylene and vinyl acetate and 0.5 to 5.0 weight percent EVA copolymer. The incorporation of nitrile-containing copolymer such as SAN copolymer is not mentioned in this patent.

SUMMARY OF THE INVENTION

It has been discovered that compatibilized blends of certain EVA copolymers and/or E-VA-VOH terpolymers in SAN copolymer can be readily and conveniently obtained by blending PVC or CPE as the third component of the blend.

Broadly stated, the compatibilized polymer triblends of this invention (in which all quantities are given by weight) comprise:

a. from about 5 parts per hundred (pph) to about 40 pph of at least one resin selected from the group consisting of:
   i. a copolymer of ethylene and vinyl acetate containing from about 25 percent to about 75 percent vinyl acetate, and
   ii. a terpolymer of ethylene, vinyl acetate and the theoretical monomer vinyl alcohol containing from about 20 percent to about 80 percent ethylene, from about 18 percent to about 60 percent vinyl acetate and from about 2 percent to about 20 percent vinyl alcohol;
b. from about 50 pph to about 95 pph of a copolymer of styrene and acrylonitrile containing from about 15 percent to about 40 percent acrylonitrile; and,
c. from about 0.1 pph to about 40 pph of a chlorine-containing polymer.

The resulting polymer triblends possess enhanced impact strength and injection moldability without any loss of heat aging resistance. This result is all the more surprising in view of what is known regarding the characteristics of blends of PVC and ABS resin. Such blends demonstrate little if any gain in impact resistance and generally undergo a loss of injection moldability and possess a lower resistance to heat aging.

DESCRIPTION OF THE PREFERRED EMBODIMENTS

In the description of the invention which follows and in the claims, all quantities are given by weight except as otherwise specified.

The EVA copolymers which are useful in the preparation of the polymer triblends of this invention are copolymers of ethylene and vinyl acetate in a ratio of about 60:30 to about 25:75 and preferably about 65:35 to about 30:70 by weight. The copolymers are a well known type of resin which can be prepared by any of the known and conventional polymerization techniques. The melt flow rate (MFR) of the useful EVA copolymers can be more than about 50 g per 10 minutes as measured under ASTM D-1238 Condition E, but advantageously is less than about 30 g per 10 minutes. The most preferred EVA copolymers will have an MFR less than about 5 g per 10 minutes. Such low MFRs can be readily obtained by crosslinking the copolymers employing known and conventional crosslinking methods. The EVA copolymer can also contain insoluble gel, preferably in an amount representing about 30 percent to about 90 percent of the copolymer, when superior results are sought for blends containing low levels of PVC. The aforesaid insoluble gel content is also preferred when the vinyl acetate content of the EVA copolymer is less than about 50 percent. Meaningful MFR measurements cannot be obtained for the gel-containing resins but it is estimated that the resins will have an MFR of less than about 0.05 g per 10 minutes. The EVA copolymers herein can also contain one or several monomers copolymerizable with ethylene and vinyl acetate not to exceed about 10 percent of the copolymer. Thus, for example the EVA copolymers of this invention can be prepared to include modifying termonomers such as (meth) acrylate ester, e.g., ethyl acrylate, butyl methacrylate, 2-hydroxy ethyl acrylate, and the like; vinyl esters, e.g., vinyl stearate, vinyl versatate, vinyl benzoate, and the like; vinyl ethers, e.g., ethyl vinyl ether, hexyl vinyl ether, and the like; and, carbon monoxide. As noted above, E-VA-VOH terpolymer can be used in partial or total replacement of the EVA copolymer in the triblends of this invention. The useful E-VA-VOH terpolymers will contain from about 20 percent to about 80 percent ethylene, from about 18 percent to about 60 percent vinyl acetate and from about 2 percent to about 20 percent vinyl alcohol. As is well known, E-VA-VOH terpolymers are obtained by converting the vinyl acetate groups of an EVA copolymer to vinyl alcohol groups employing such techniques as alcoholysis, saponification or hydrolysis. Like the EVA copolymers, supra, the E-VA-VOH terpolymers can contain up to 10 percent of copolymerizable monomer, e.g., any of the monomers which can be copolymerized with ethylene and vinyl acetate, a number of which have been identified herein.

The SAN copolymers which can be utilized in the polymer triblends herein are prepared by copolymerizing styrene and acrylonitrile in a known manner in a ratio of about 85:15 to about 60:40, and preferably about 80:20 to about 65:35 by weight. Up to about 20 percent of the styrene can be replaced with another vinyl aromatic monomer such as an alpha-alkyl styrene, e.g., alpha-methyl styrene and the ring chlorinated analogs thereof; similarly, up to about 20 percent of the acrylonitrile component can be replaced with another nitrile-containing monomer, e.g., methacrylonitrile.

The preferred PVC resins herein are vinyl chloride homopolymers containing at least about 95 percent polymerized vinyl chloride. The PVC can also contain up to 5 weight percent of a copolymerizable monomer such as vinylidene halide; a vinyl ester, e.g., vinyl acetate; acrylic and alpha-alkyl acrylic acids, e.g., acrylic acid and methacrylic acid; an alkyl ester of such an acid, e.g., methyl acrylate, ethyl acrylate, methyl methacrylate; an amide of such an acid, e.g., acrylamide, methacrylamide; unsaturated nitriles, e.g., acrylonitrile, methacrylonitrile, ethacrylonitrile; a vinyl aromatic, e.g., styrene and alpha-alkyl styrenes; dialkyl esters of maleic acid, e.g., dimethyl maleate and the corresponding fumarates; vinyl alkyl ethers and ketones, and various other ethylenically unsaturated compounds copolymerizable with vinyl chloride.

CPE resin can be used in partial or complete replacement of PVC in the polymer triblends of this invention. Chlorinated copolymers of ethylene and minor amounts of other alpha-olefins such as propylene and butene can also be used. The chlorine can be arranged in the CPE resins predominantly in a random or uniform manner along the polymer molecule and must be present therein at a level of from about 25 percent to about 45 percent. The processes for preparing the starting polyethylene or polyethylene alpha-olefin copolymer and the procedures used for chlorinating the same are well known in the art. CPE resins can be advantageously employed when discoloration of the polymer blends is a significant concern since unlike the PVC resins, CPE resins are given to little or no discoloration due to thermal dehydrochlorination reactions.

The amount of the polymer components contained in the triblends herein can vary from about 5 pph to about 40 pph EVA copolymer or E-VA-VOH terpolymer; from about 95 pph to about 50 pph SAN copolymer; from about 0.1 pph to about 40 pph PVC when EVA copolymer is present and from about 5 pph to about 40 pph of this resin when E-VA-VOH terpolymer is present; and, in place of PVC, from about 5 pph to about 40 pph CPE. Preferred ranges are about 10 pph to about 30 pph EVA copolymer, about 80 pph to about 50 pph SAN copolymer and about 1 pph to about 30 pph chlorine-containing polymer.

The blends are prepared by heat plastifying and mechanically working the polymeric ingredients in admixture with one another in the usual way as by blending the polymeric materials on heated rolls, in a Banbury mixer, or in a plastic extruder until a homogeneous and uniform composition is obtained. Temperature in the blending step can vary from about 150° C. to about 210° C. Lower temperatures are ineffective for melt mixing and higher temperatures induce undesirable decomposition and discoloration. It is advantageous to include PVC stabilizers in the triblends to permit thorough mixing without discoloration. Pressure can vary from about 0.1 to about 10 atmospheres or more, but atmospheric pressure is usually suitable. In general, compounding the heat plastified ingredients with one another for periods of from about 0.1 to about 30 minutes, and preferably from about 0.2 to about 15 minutes, provides satisfactory results. Intensive mixing requires less time than low shear mixing but requires greater care to prevent PVC decomposition. Particularly when PVC is employed, blending should not extend beyond the period sufficient to provide acceptable mixing of the polymer ingredients so as to avoid or minimize any resin decomposition. The three components of the triblend can be compounded in any order of addition. However, it is usually preferred to first add the chlorine-containing polymer, i.e., PVC or CPE, to the molten SAN copolymer which contains a stabilizer and/or other adjuvant and thereafter add the EVA copolymer or E-VA-VOH terpolymer.

Known and conventional molding aids can be incorporated into the polymer triblends as desired. Accordingly, the blends can be prepared to include stabilizers in amounts up to about 5 pph, preferably from about 0.5 pph to about 3 pph; lubricants in amounts up to about 4 pph, preferably from about 0.1 pph to about 3 pph; chelating agents and antioxidants in amounts up to about 2 pph, preferably from about 0.1 pph to about 1.5 pph; pigments and dyes in amounts up to about 5 pph, preferably from about 1 pph to about 4 pph; fillers in amounts up to 10 pph; and processing aids in amounts up to about 5 pph, preferably from 1 pph to about 4 pph.

The following examples are illustrative of the polymer triblends of this invention and the manner in which they are prepared. Where melt flow rates are given, these are according to ASTM Method D-1238 and are reported in g per 10 minutes under Condition E unless otherwise specified. EVA gel contents were determined as percent of a 0.2-0.3g sample insoluble in a suitable solvent for the EVA after 24 hours suspension in the stirred solvent.

Izod impact strengths, reported in ft. lb. per in., were determined according to ASTM Method D-256 except that 1/12 inch rather than ⅛ inch thick specimens were used. Gardner impact strengths, given in in. lb. per mil., were determined using the Gardner Laboratory 1120-M Variable Height Impact Tester on 1¾ by ⅛ inch discs at a 50 percent failure level. Impact tests were at 73° F. unless otherwise noted. Other tests whose results are set forth herein were carried out according to the pertinent ASTM methods.

EXAMPLE 1

In the roller blade equipped mixing chamber of a C. W. Brabender Plastograph jacketed at 170° C. and blanketed with nitrogen were blended 32 parts of Dow Company TYRIL-867 SAN resin with 8 parts of an EVA copolymer having 43 percent vinyl acetate content and a MFR of 11.8 g/10 min. The blend was masticated for 10 minutes at 60 rpm, removed, cut and cooled. Upon compression molding, the blend was found to be brittle in blending and to have a Gardner impact resistance only 0.02 in. lb./mil.

EXAMPLE 2

Example 1 was repeated, except that the EVA was crosslinked with a minor amount of dicumylperoxide at 160-175° C. to reduce its MFR to 0.03 g/10 min. The peroxide treated EVA had no toluene insoluble gel content. The blend with SAN had a Gardner impact resistance 0.1 in. lb./mil, but retained a strong tendency to shatter when impacted.

EXAMPLE 3

Example 2 was repeated, except that 0.8 part of B. F. Goodrich Company GEON-103-EP PVC (100% polymerized vinyl chloride) resin was added with the EVA. This blend (about 78:2:20 SAN-PVC-EVA) was tough and had a Gardner impact resistance 1.0 in. lb./mil.

EXAMPLE 4

35 Parts of the EVA copolymer of Example 1 were milled at 50 rpm in the Plastograph mixer with the jacket at 170° C. and under nitrogen. 0.005 Part of dicumylperoxide (DICUP-R) was added and mixing was continued for 15 minutes, the speed being reduced as necessary to keep the mix temperature from exceeding 170° C. There resulted a clear, tough rubber which contained 54 percent toluene insoluble gel.

8 Parts of this partly gelled EVA copolymer were blended into 32 parts of TYRIL-867 SAN as in Example 1 with the addition of 0.1 part AGERITE-D antioxidant (trimethyldihydroquinoline polymer of the R. T. Vanderbilt Co.) followed by 0.25 part MARK-235 and 0.2 part MARK-C stabilizers (respectively, barium cadmium soap mixture; organic chelating agent of the Argus Chemical Co.). The mixture was masticated 10 minutes at 60 rpm (Part A).

The final blend was reproduced (Part B) but this time .0.8 parts of the PVC of Example 3 was added after the first 5 minutes of mastication, which was then continued another 5 minutes (total 10 minutes).

The product of Part A had a Gardner impact strength of only 0.05 in. lb./mil; in contrast, that of Part B had a Gardner impact strength of 2.5 in. lb./mil.

The properties of the resin compositions of Examples 1 to 4 are summarized in TABLE I below as follows:

TABLE I

| | PVC is Essential to San-Eva Blend Toughness | | | |
|---|---|---|---|---|
| Ex. No. | PVC, PHR* | EVA MFR, g/10 min | EVA Gel, % | Gardner Impact, in. lb./mil |
| 1 | 0 | 11.8 | 0 | 0.02 (Brittle) |
| 2 | 0 | 0.03 | 0 | 0.1 (Brittle) |
| 3 | 2 | 0.03 | 0 | 1.0 (Tough) |
| 4A | 0 | — | 54 | 0.05 (Brittle) |
| 4B | 2 | — | 54 | 2.5 (Tough) |

*Based on SAN-EVA 80:20

EXAMPLE 5

There were blended in the Plastograph 32 parts of the SAN copolymer of Example 1 and 8 parts of an EVA copolymer containing 60 percent vinyl acetate and 77 percent gel insoluble in 75:25 toluene-methanol, 2.1 parts PVC being added to the blend. The final triblend had a SAN-PVC-EVA ratio of about 76:5:19 and a Gardner impact resistance 2.8 in. lb./mil.

EXAMPLE 6

The following blend was prepared in a Brabender Prep Center mixer equipped with roller blades and jacketed at 170° C., materials being listed in order of addition: 100 parts SAN copolymer, 0.6 part AGERITE D, 1.5 part MARK 235, 1.2 part by volume MARK C, 33 parts PVC and 43 parts SAN copolymer. After mixing for 5 minutes at 60 rpm, there were added 44 parts of an EVA copolymer containing 60 percent vinyl acetate and having a MFR of 9.1. The total was then mixed 5 minutes more, the mixing speed being adjusted as necessary to hold the blend temperature at 185°-190° C. The product triblend, with a SAN-PVC-EVA ratio of about 65:15:20, had a Gardner impact strength of 2.2 in. lb./mil, an Izod impact strength of 5.4 ft. lb./in. and a MFR (Condition G) of 1.04 g/10 min compared to 0.01, 0.1 and 1.0 for the SAN copolymer resin only. It is evident that excellent impact resistance without loss of moldability had been achieved by blending the SAN copolymer with PVC and EVA copolymer in combination.

EXAMPLE 7

To demonstrate that PVC alone does not function as an impact modifier for SAN copolymer, 8 parts of the PVC of Example 3 were blended into 32 parts of the SAN copolymer of Example 1. The blend had a Gardner impact strength of only 0.02. It is apparent by comparing the results of this experiment with those of Examples 1-4 that EVA copolymer addition is essential to provide SAN-PVC resin blend toughness.

EXAMPLE 8

Blends of 110 parts TYRIL 867 SAN copolymer, 66 parts GEON 103 EP PVC and 44 parts of EVA copolymer were prepared containing antioxidant and inhibitors according to the general directions of Example 6 to produce SAN-PVC-EVA triblends having a ratio of 50:30:20. Properties of the resin compositions containing different EVA copolymer are summarized in TABLE II as follows:

TABLE II

High Impact Triblends From High MFR EVA Copolymers

| Ex. No. | EVA Copolymer % VA | MFR | Triblend Impact Strength Gard. (in. lb./mil) | Izod (ft.lb./in.) |
|---|---|---|---|---|
| 8A | 50 | 2.8 | 2.2 | 2.6 |
| 8B | 55 | 8.3 | 2.4 | 7.6 |
| 8C | 60 | 9.1 | 2.9 | 3.8 |

EXAMPLE 9

The exceptional weatherability of the triblends of this invention was demonstrated by comparison of a 75:5:20 SAN-PVC-EVA composition, in which the EVA copolymer had 43 percent vinyl acetate and 51 percent toluene insoluble gel, with a commercial ABS resin, CYCOLAC L (Borg-Warner Company). Compression molded plaques of the triblend and ABS resin were exposed to 1200 hours artificial weathering in an Atlas Model 600/x W-WR xenon Weather-Ometer with a wet cycle for 18 of each 120 minutes. After 1200 hours the SAN-PVC-EVA triblend retained 86 percent of its original Izod impact strength versus only 45 percent retention for the ABS resin.

EXAMPLE 10

Superiority of the triblends of this invention in heat age resistance was demonstrated by comparing a 78:2:20 SAN-PVC-EVA composition, in which the EVA copolymer had about 50 percent vinyl acetate and 62 percent toluene insoluble gel, with Borg-Warner Company CYCOLAC L into which had been blended 2 percent PVC (ABS-PVC, 98:2). After aging 400 hours at 80° C. in a circulating air oven, compression molded discs of the SAN-PVC-EVA triblend retained 65 percent of the original Gardner impact strength versus only 16 percent for the ABS-PVC blend. In addition, the 98:2 ABS-PVC blend before aging had only 80% of the Gardner impact strength evidenced by the CYCOLAC L itself (1.6 versus 2.0 in. lb./mil).

The properties of the resin compositions of Examples 9 and 10 are summarized in TABLE III as follows:

TABLE III

SAN-PVC-EVA Triblends Have Exceptional Stability

| Composition Type | Ex. No. | Exposure and Time | Impact Strength* Orig. | Final | % Retained |
|---|---|---|---|---|---|
| SAN-PVC-EVA | 9 | Xenotest, 1200 hr | 3.3I | 2.85I | 86 |
| ABS | 9 | Xenotest, 1200 hr | 4.9I | 2.2I | 45 |
| SAN-PVC-EVA | 10 | 80° C, 400 hr | 1.7G | 1.1G | 65 |
| ABS-PVC | 10 | 80° C, 400 hr | 1.6G | 0.25G | 16 |

*I is Izod in ft. lb./in.
G is Gardner in in. lb./mil

EXAMPLE 11

The following blend was prepared in the Brabender Plastograph jacketed at 170° C. and blanketed with nitrogen, materials being listed in order of addition: 22 parts TYRIL-867 SAN, 8 parts EVA copolymer, 0.25 part MARK 235, 0.1 part AGERITE-D, 0.2 part MARK C and finally, 10 additional parts of TYRIL-867 SAN copolymer. The mixture was masticated for 5 minutes at 60 rpm and 0.9 parts CPE (Dow Chemical, Type 3614, 36% chlorine content) were then added. After an additional 10 minutes of mixing under the same conditions, the Gardner impact resistance was about 0.3 in. lb./mil.

EXAMPLE 12

Example 11 was repeated but with 3.25 parts of CPE being employed. The Gardner impact resistance of the resin blend was about 1.5 in. lb./mil.

EXAMPLE 13

In the Plastograph mixer of Example 1 were blended 26 parts of Monsanto Company LUSTRAN-31-Crystal-357 lubed SAN resin, 0.1 part AGERITE-D, 0.3 part MARK-235, 0.1 part MARK-C and 6 parts GEON-103EP PVC for 5 minutes at 60 rpm. Then 8 parts of an ethylene-vinyl acetate-carbon monoxide terpolymer (61:35:4 monomer ratio, MFR 0.64 g/10 min. at Condition B) were added and mixing was continued 5 minutes to a temperature of 186° C. internal. The tough blend had a Gardner impact resistance 3.6 in. lb/mil. A similar blend (SAN:EVACO 32:8) without PVC was brittle and had a Gardner impact resistance only 0.1 in. lb./mil.

EXAMPLE 14

This example illustrates triblends containing ethylene-vinyl acetate-vinyl alcohol.

In the C. W. Brabender Prep Center mixer jacketed at 120° C. and under nitrogen blanket, 0.6 part of AGERITE-D antioxidant was blended into 210 parts of EVA copolymer which analyzed for 42.3 percent vinyl acetate, by saponification. Then there were added 9 parts of sodium hydroxide pellets followed by 2 parts of water. After mixing for 5 minutes at 35 rpm and 5 minutes at 20 rpm, the partly saponified EVA was removed, cut into chunks and bagged. A sample, freed of sodium acetate by water extraction of a toluene solution, analyzed for 34.0 percent vinyl acetate; that is, the produced terpolymer was ethylene-vinyl acetate-vinyl alcohol 60.5:34.6:4.9.

A triblend was prepared according to the procedure of Example 6, but using instead of EVA, the terpolymer prepared above. Sodium acetate remained in the blend, no attempt being made to remove it from the partly saponified EVA. The product triblend had Gardner and Izod impact strengths of 1.6 in. lb./mil and 2.5 ft. lb./in. respectively, and fully retained its Izod impact strength after 1200 hours exposure in the Atlas Weather-Ometer xenotest of Example 9.

EXAMPLE 15

750 Parts TYRIL-867 SAN, 232 parts EVA (U.S. Industrial Chemicals Co. production lot V-70326 with vinyl acetate 63.3 percent and MFR 1.13 g./10 min. at condition B), 173 parts GEON-103 EP PVC, 3.1 parts AGERITE-D, 7.8 parts MARK-235 and 2.6 parts MARK-C were introduced together into a Banbury mixer of 2.5 lb. capacity rating. Mixing was started with steam applied to melt the charge. When the charge reached 350° F., steam was removed and time started. Mixing of the molten charge was continued for exactly 30 seconds at up to 370° F. maximum. The product blend, sheeted on a two-roll mill and cut into chunks, was glossy white and had a Gardner impact resistance 3.9 ft. lb./mil.

EXAMPLE 16

According to the directions in EXAMPLE 14, 210 parts of EVA (50 percent vinyl acetate by saponification) containing 0.6 part of AGERITE-D was partly hydrolyzed with 8.2 parts of sodium hydroxide followed by 2 parts of water. The resulting ethylene-vinyl acetate-vinyl alcohol terpolymer was blended with SAN and PVC according to the general procedure of Example 6 to furnish triblends at the compound ratios shown in TABLE IV:

TABLE IV

Rubber Component Level may Vary in Triblends

| Experiment Part | SAN-PVC-(E-VA-VOH) Ratio | Gardner Impact, In. Lb./Mil. |
|---|---|---|
| A | 85:15: 0 | 0.02 |
| B | 75:15:10 | 0.8 |
| C | 70:15:15 | 0.9 |
| D | 65:15:20 | 2.0 |
| E | 60:15:25 | 2.5 |

What is claimed is:

1. Compatibilized polymer triblends which comprise:
   a. from about 5 to about 40 pph of at least one resin selected from the group consisting of:
      i. a copolymer of ethylene and vinyl acetate containing from about 25 percent to about 75 percent vinyl acetate, and
      ii. a terpolymer of ethylene, vinyl acetate and the theoretical monomer vinyl alcohol containing from about 20 percent to about 80 percent ethylene, from about 18 percent to about 60 percent vinyl acetate and from about 2 percent to about 20 percent vinyl alcohol;
   b. from about 50 pph to about 95 pph of a copolymer of styrene and acrylonitrile containing from about 15 percent to about 40 percent acrylonitrile; and,
   c. from about 0.1 pph to about 40 pph of a chlorinated polyethylene.

2. The polymer triblends of claim 1 wherein copolymer (a) (i) contains a ratio of ethylene to vinyl acetate of from about 65:35 to about 30:70.

3. The polymer triblends of claim 1 wherein the melt flow rate of copolymer (a) (i) is less than about 30 g per 10 minutes as measured under ASTM D-1238 Condition E.

4. The polymer triblends of claim 3 wherein the melt flow rate of copolymer (a) (i) is less than about 5 g per 10 minutes as measured under ASTM D-1238 Condition E.

5. The polymer triblends of claim 1 wherein copolymer (a) (i) contains at least one additional monomer copolymerizable with ethylene and vinyl acetate, said additional monomer not exceeding about 5 percent of the copolymer.

6. The polymer triblends of claim 5 wherein copolymer (a) (ii) is obtained by the partial alcoholysis, saponification or hydrolysis of copolymer (a) (i).

7. The polymer triblends of claim 1 wherein copolymer (b) contains a ratio of styrene to acrylonitrile of from about 80:20 to about 65:35.

8. The polymer triblends of claim 1 wherein copolymer (b) contains up to about 20 percent of another vinyl aromatic monomer in partial replacement of styrene.

9. The polymer triblends of claim 1 wherein copolymer (b) contains up to about 20 percent of another nitrile-containing monomer in partial replacement of acrylonitrile.

10. The polymer triblends of claim 1 containing from about 10 pph to about 30 pph EVA copolymer, from about 80 to about 50 pph SAN copolymer and about 1 pph to about 30 pph chlorinated polyethylene.

11. Compatibilized polymer triblends which comprise:
    a. from about 5 to about 40 pph of at least one resin selected from the group consisting of:
       i. a copolymer of ethylene and vinyl acetate containing from about 25 percent to about 75 percent vinyl acetate, and
       ii. a terpolymer of ethylene, vinyl acetate and the theoretical monomer vinyl alcohol containing from about 20 percent to about 80 percent ethylene, from about 18 percent to about 60 percent vinyl acetate and from about 2 percent to about 20 percent vinyl alcohol;
    b. from about 50 pph to about 95 pph of a copolymer of styrene and acrylonitrile containing from about 15 percent to about 40 percent acrylonitrile; and,
    c. from about 0.1 pph to about 40 pph of a polyvinyl chloride.

12. The polymer triblends of claim 11 wherein copolymer (a) (i) contains a ratio of ethylene to vinyhl acetate of from about 65:35 to about 30:70.

13. The polymer triblends of claim 11 wherein the melt flow rate of copolymer (a) (i) is less than about 30 g per 10 minutes as measured under ASTM D-1238 Condition E.

14. The polymer triblends of claim 13 wherein the melt flow rate of copolymer (a) (i) is less than about 5 g per 10 minutes as measured under ASTM D-1238 Condition E.

15. The polymer triblends of claim 11 wherein copolymer (a) (i) contains at least one additional monomer copolymerizable with ethylene and vinyl acetate, said additional monomer not exceeding about 5 percent of the copolymer.

16. The polymer triblends of claim 15 wherein copolymer (a) (ii) is obtained by the partial alcoholysis, saponification or hydrolysis of copolymer (a) (i).

17. The polymer triblends of claim 11 wherein copolymer (b) contains a ratio of styrene to acrylonitrile of from about 80:20 to about 65:35.

18. The polymer triblends of claim 11 wherein copolymer (b) contains up to about 20 percent of another vinyl aromatic monomer in partial replacement of styrene.

19. The polymer triblends of claim 11 wherein copolymer (b) contains up to about 20 percent of another nitrile-containing monomer in partial replacement of acrylonitrile.

20. The polymer triblends of claim 11 wherein polyvinyl chloride (c) contains at least about 95 percent polymerized vinyl chloride.

21. The polymer triblends of claim 20 wherein polyvinyl chloride (c) contains at least one additional monomer copolymerizable with vinyl chloride, said additional monomer not exceeding about 5 percent of the polyvinyl chloride.

22. The polymer triblends of claim 11 containing from about 10 pph to about 30 pph EVA copolymer, from about 80 to about 50 pph SAN copolymer and about 1 pph to about 30 pph of a polyvinyl chloride containing at least about 95 percent polymerized vinyl chloride.

* * * * *